United States Patent
Leonard (10) Patent No.: US 9,432,445 B1
(45) Date of Patent: Aug. 30, 2016

(54) SYSTEM AND METHOD OF MAINTAINING AN ENQUEUE RATE OF DATA MESSAGES INTO A SET OF QUEUES

(71) Applicant: Sprint Communications Company L.P., Overland Park, KS (US)

(72) Inventor: Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 584 days.

(21) Appl. No.: 13/897,220

(22) Filed: May 17, 2013

(51) Int. Cl.
*H04L 29/06* (2006.01)
*H04L 29/08* (2006.01)

(52) U.S. Cl.
CPC ..................... *H04L 67/10* (2013.01)

(58) Field of Classification Search
CPC ....................................... H04L 67/10
USPC ........................................ 709/219
See application file for complete search history.

(56) References Cited

U.S. PATENT DOCUMENTS

| | | | | |
|---|---|---|---|---|
| 7,782,885 B1* | 8/2010 | Sabato | ................ | H04L 12/5693 370/389 |
| 8,196,151 B1 | 6/2012 | Leonard | | |
| 8,397,244 B2* | 3/2013 | Surlaker | ................. | G06F 9/546 719/314 |
| 8,639,965 B1* | 1/2014 | Anugu | .................... | H04L 67/02 714/4.1 |
| 2003/0231593 A1* | 12/2003 | Bauman | ................. | H04L 29/06 370/235 |
| 2004/0117794 A1* | 6/2004 | Kundu | .................... | G06F 9/505 718/102 |
| 2004/0215998 A1 | 10/2004 | Buxton et al. | | |
| 2004/0244007 A1* | 12/2004 | Garza | .................... | G06F 9/5083 718/105 |
| 2005/0089053 A1 | 4/2005 | Zhu | | |
| 2006/0106960 A1 | 5/2006 | Hickson et al. | | |
| 2006/0133278 A1 | 6/2006 | Hill et al. | | |
| 2006/0146711 A1 | 7/2006 | Anbarani | | |
| 2006/0212367 A1 | 9/2006 | Gross | | |
| 2008/0013452 A1* | 1/2008 | Goetzinger | ......... | H04L 12/5693 370/235 |
| 2013/0195108 A1* | 8/2013 | Hu | .......................... | G06F 9/546 370/392 |
| 2013/0290513 A1* | 10/2013 | Shikari | ................... | G06F 9/546 709/224 |

OTHER PUBLICATIONS

Duchovni, Victor, "Postfix Bottleneck Analysis", Dec. 25, 2006. 9 pages.
Duchovni, Victor, "QSHAPE(1)", Oct. 27, 2007. 2 pages.
Venema, Wietse, "QMGR(8)", Oct. 17, 2007. 6 pages.
Pre-Interview Communication dated Aug. 9, 2011, U.S. Appl. No. 12/132,416, filed Jun. 3, 2008.

(Continued)

*Primary Examiner* — Kevin Bates
*Assistant Examiner* — Nazia Naoreen (57) ABSTRACT

A system comprises a component which receives an initial status message, from a primary queue manager, comprising a rate of data messages moving into a primary queue. The component detects that a primary queue rate is below a predetermined range based on the received initial status message. The component increases the weight of the primary queue in response to detecting that the primary queue rate provided by the initial status message is below the predetermined range. The component receives a subsequent status message, from the primary queue manager, comprising the rate of data messages moving into the primary queue. The component detects that the primary queue has a rate below the predetermined range based on the received subsequent status message. The component activates a secondary queue in response to detecting that the primary queue rate provided by the subsequent status message is below the predetermined range.

20 Claims, 4 Drawing Sheets (56) References Cited

OTHER PUBLICATIONS

First Action Interview Office Action dated Oct. 11, 2011, U.S. Appl. No. 12/132,416, filed Jun. 3, 2008.
Notice of Allowance dated Feb. 9, 2012, U.S. Appl. No. 12/132,416, filed Jun. 3, 2008.
Pre-Interview Communication dated Jun. 15, 2015, U.S. Appl. No. 13/802,325, filed Mar. 13, 2013.
Leonard, Mark D., "System and Method of Calculating and Reporting of Messages Expiring From a Queue," filed Mar. 13, 2013, U.S. Appl. No. 13/802,325.
First Action Interview Office Action dated Nov. 10, 2015, U.S. Appl. No. 13/802,325, filed Mar. 13, 2013.
Final Office Action dated Feb. 11, 2016, U.S. Appl. No. 13/802,325, filed Mar. 13, 2013.
Advisory Action dated Apr. 26, 2016, U.S. Appl. No. 13/802,325, filed on Mar. 13, 2013.

* cited by examiner

SYSTEM AND METHOD OF MAINTAINING AN ENQUEUE RATE OF DATA MESSAGES INTO A SET OF QUEUES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Large business enterprises typically include computer systems that may be monitored to analyze performance efficiencies, such as for system optimization or error detection purposes. Examples of such systems are mainframe and personal computer networks, which may include queues for handling message requests. Message queues typically receive, process, and forward requests for information and services. Message queuing is a method of application-to-application communication, such as communication between an application that services a user and an application that retrieves data from a database. Applications may communicate by writing and reading application-specific data, or messages, to and from queues, without having a dedicated synchronous link between the applications. Messaging means that applications communicate with each other by sending discrete amounts of data in messages to some intermediary, and not necessarily by calling each other directly. Queuing implies that applications communicate through queues, which may remove the requirement for both the sending application and the receiving application to execute concurrently and/or synchronously. In other words, the sending and receiving of messages is asynchronous, and there is typically no time dependency between sending and receiving, except that which may be imposed by the applications themselves.

SUMMARY

In some embodiments, a computer readable storage medium is provided. The computer readable storage medium comprising a cluster server repository component stored as a set of computer instructions executable by a processor. The cluster server repository component is configured to receive an initial status message, from a primary queue manager, comprising the enqueue rate of data messages moving into a primary queue of the primary queue manager. The cluster server repository component is configured to detect that the primary queue has an enqueue rate below a predetermined range based on the received initial status message. Additionally, the cluster server repository component is configured to increase the weight of the primary queue in response to detecting that the enqueue rate of the primary queue provided by the initial status message is below the predetermined range. Furthermore, the cluster server repository component is configured to receive a subsequent status message, from the primary queue manager, comprising the enqueue rate of data messages moving into the primary queue. The cluster server repository component is also configured to detect that the primary queue has an enqueue rate below the predetermined range based on the received subsequent status message. Additionally, the cluster server repository component is configured to activate a secondary queue of a secondary queue manager in response to detecting that the enqueue rate of the primary queue provided by the subsequent status message is below the predetermined range.

In some embodiments, a method is provided for maintaining an enqueue rate of data messages into a set of queues. The method comprises receiving, by a cluster server repository, an initial status message, from a primary queue manager, comprising the enqueue rate of data messages moving into a primary queue of the primary queue manager. The method additionally comprises detecting, by the cluster server repository, that the primary queue has an enqueue rate below a predetermined range based on the received initial status message. The method further comprises increasing, by the cluster server repository, a weight of the primary queue in response to detecting that the enqueue rate of the primary queue provided by the initial status message is below the predetermined range. The method also comprises receiving, by the cluster server repository, a subsequent status message, from the primary queue manager, comprising the enqueue rate of data messages moving into the primary queue. The method further comprises detecting, by the cluster server repository, that the primary queue has an enqueue rate below the predetermined range based on the received subsequent status message. The method additionally comprises activating, by the cluster server repository, a secondary queue of a secondary queue manager in response to detecting that the enqueue rate of the primary queue provided by the subsequent status message is below the predetermined range.

In some embodiments, a method is provided for maintaining an enqueue rate of data messages into a set of queues. The method comprises receiving, by a cluster server repository, an initial status message, from a primary queue manager, comprising the enqueue rate of data messages moving into a primary queue of the primary queue manager. The method additionally comprises detecting, by the cluster server repository, that the primary queue has an enqueue rate above a predetermined range based on the received initial status message. The method further comprises decreasing, by the cluster server repository, the enqueue rate of the primary queue in response to detecting that the enqueue rate of the primary queue provided by the initial status message is above the predetermined range. The method also comprises receiving, by the cluster server repository, a subsequent status message, from the primary queue manager, comprising the enqueue rate of data messages moving into the primary queue. The method further comprises detecting, by the cluster server repository, that the primary queue has an enqueue rate within the predetermined range while the weight of the primary queue is below a threshold, wherein detecting is based on the received subsequent status message. The method additionally comprises activating, by the cluster server repository, a secondary queue of a secondary queue manager in response to detecting that the enqueue rate of the primary queue is within the predetermined range while the weight of the primary queue is below the threshold.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a system is disclosed for maintaining a rate of data messages communicating from one or more front end applications from a front end queue in a front end server, through a cluster of queues, and to one or more back end applications from a back end server. Generally, as messages move through the cluster of primary queues, they may move according to a distribution system. The distribution system may distribute messages through particular primary queues of the cluster, for example depending on the message destinations as well as to maintain a predetermined rate among each primary queue of the queue cluster. Generally, when a rate of messages flowing into a primary queue (i.e. enqueue rate) increases or decreases, the distribution system may adjust the weights of one or more primary queues and/or the enqueue rate of messages going into one or more primary queues. Occasionally, one or more primary queues may not respond to adjustments to the weights and/or the enqueue rate or do not respond as intended. In this case, it may have been determined that those primary queues which do not respond to adjustments have failed or are at least not able to run as intended. Previously, the distribution system may have adjusted the remaining primary queues of the cluster to compensate for the lost capacity of the nonresponsive primary queue. Thus, after each primary queue became nonresponsive, reliance and stress may have increased on the remaining primary queues creating a potential domino-effect so that eventually (and maybe quickly) all of the primary queues became nonresponsive. Only when the last primary queue would become nonresponsive, would a cluster of secondary queues activate to accommodate the loss in message flow from the front end servers to the back end servers. Conversely, the present system may activate individual secondary queues of the secondary cluster after one or more primary queues fail to respond to adjustments rather than wait until the last primary queue becomes nonresponsive. This may allow the remaining functioning primary queues to maintain their enqueue rate(s) when one or more primary queues fails to function properly and/or becomes nonresponsive. Additionally, the burden on maintenance personnel may be reduced to fewer primary queue(s) by reducing the likelihood of the domino-effect.

The cluster of queues generally may comprise a primary set of queues and a secondary set of queues. The system may comprise a cluster server repository component which monitors data message flow, for example, the enqueue rate (i.e. the rate that data messages move into a queue), directs which queues receive the data messages, and controls the weights (e.g. vary the capacity of a queue so that a queue operating at full capacity may be able to handle receiving a quantity of messages per unit of time, while the same queue at half capacity may be able to handle receiving only half the quantity of messages per the same unit of time) of the primary and secondary queues. During operation, the primary queues may receive data messages from a front end server. Primary queue managers associated with the primary queues may distribute the data message through the primary queues using the cluster server repository component as a guide. The secondary queues may remain inactive while the primary queues are active. However, in the event that a primary queue fails, one or more secondary queues may be activated by the cluster server repository component. The cluster server repository component may then direct the queue manager associated with a front end queue as well as the other primary queue managers which have functioning queues to direct data messages to the activated secondary queue. In an embodiment, the cluster server repository component may also direct the queue manager to deactivate the failed queue.

The cluster server repository component may also determine when a primary queue has failed so that it knows when to activate a secondary queue. The primary queue managers may send status messages to the cluster server repository component providing information to the cluster server repository component such as the enqueue rate and/or the weight of one or more primary queues. In an embodiment, the cluster server repository component may have stored the proper enqueue rates and weights for each primary queue and may determine based on a received status message that a primary queue is receiving data messages at an enqueue rate below a predetermined range. The cluster server repository may increase the weight of the primary queue in order to increase the enqueue rate of messages moving into the primary queue. Subsequently, the cluster server repository component may receive another message from the queue manager providing information that the primary queue is still receiving data messages at an enqueue rate below the predetermined range. At this point, the cluster server repository component may determine that the primary queue has failed. The cluster server repository component may then activate a secondary queue and instruct the front end application queue manager and/or the other queue managers of the functioning primary queue to redirect data messages from the failed primary queue to the activated secondary queue.

In an embodiment, the cluster server repository component may have stored the proper enqueue rates and weights for each primary queue and may determine based on a received status message that a primary queue is receiving data messages at an enqueue rate above a predetermined range while the primary operates within a proper range of predetermined weights. The cluster server repository may decrease the enqueue rate of messages moving into the primary queue. Subsequently, the cluster server repository component may receive another message from the queue manager providing information that the primary queue is receiving data messages at an enqueue rate within the predetermined range, but the primary queue is also operating at a weight below the proper range of predetermined weights. At this point, the cluster server repository component may determine that the primary queue has failed. The cluster server repository component may then activate a secondary queue and instruct the front end application queue manager and/or the other queue managers of the functioning primary queue to redirect data messages from the failed primary queue to the activated secondary queue.

A message queue system may be implemented using a message queue software, also known as a message-oriented middleware, and may be located in a network or data center component, such as at a server or other computer hardware component (e.g., a network interface card (NIC)). The message queue system may comprise one or more message queues that store a plurality of messages, and may be managed by a queue manager application. A message queue may be an object, e.g., a software based data structure in a memory component, that stores the messages. The message queue may store messages sent from, for example, application(s) prior to delivering or transmitting the messages to a receiving component or after receiving the messages from a transmitting component in a network or data center. Messages sent to the receiving component and/or a receiving application may be called received messages. Messages may be requested and/or removed from the queue by a receiving application. Messages may comprise collections of binary or character data, e.g., American Standard Code for Information Interchange (ASCII) or Extended Binary Coded Decimal Interchange Code (EBCDIC) characters. The data may be interpreted by an application or program and/or used by hardware to implement a function. The messages may also comprise communications protocols, storage, routing, and/or delivery information, which may be added to the messages before transmission and removed from the messages after receiving the messages or prior to delivering the messages to a receiving application.

Figure 1:
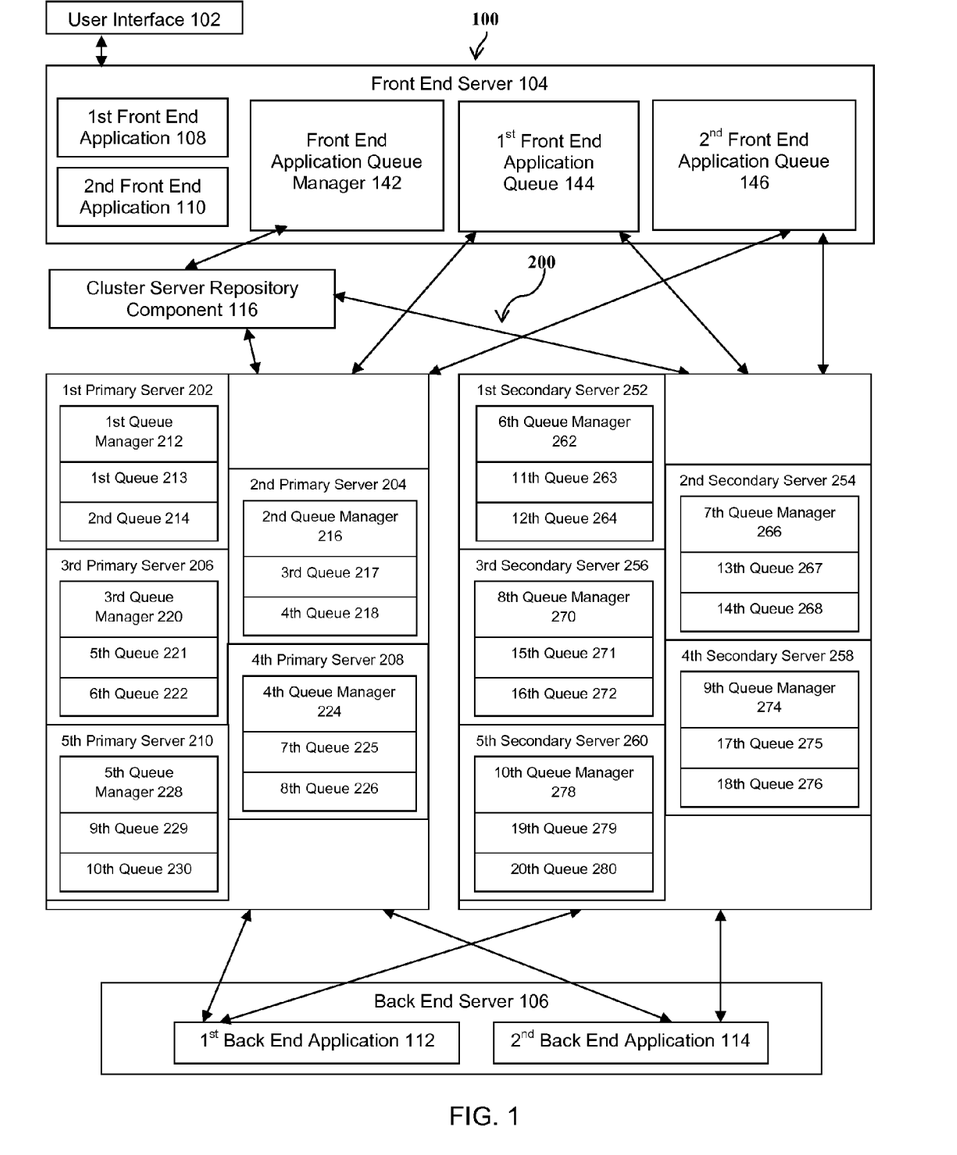
- FIG. 1 is a block diagram of a system according to an embodiment of the disclosure.

FIG. 1 is a block diagram that illustrates a system 100 for maintaining an enqueue rate of data message into a set of queues according to some embodiments of the present disclosure. The system 100 may include a user interface 102, a front end server 104, a back end server 106, a cluster server repository component 116, and a cluster server system 200. The user interface 102 enables a user of the system 100 to view information requested from the back end server 106 via the front end server 104 and/or to control execution of the front end server 104. The front end server 104 may execute front end applications, such as the first front end application 108 and the second front end application 110, which can request data from back end applications 112 and 114 executed by the back end server 106.

Messages, such as data requests made by the first front end application 108 and/or the second front end application 110, can travel through a plurality of cluster servers systems, such as cluster server system 200 before reaching the first back end application 112 and/or the second back end application 114. The cluster server system 200 may comprise a plurality of primary servers 202, 204, 206, 208, and 210 and a plurality of secondary servers 252, 254, 256, 258, and 260. Generally, as will be discussed further herein, queues of secondary server(s) may back-up queues of primary server(s) so that if one or more queue(s) of one or more primary server(s) do not function as intended and/or fail, one or more queue(s) of one or more secondary server(s) may be activated to make up for the deficiencies and/or failures of the queue(s) of the primary server(s). The primary servers 202, 204, 206, 208, and 210 implement queue managers 212, 216, 220, 224, and 228 and queues 213, 214, 217, 218, 221, 222, 225, 226, 229, and 230 that enable the front end applications 108 and 110 to communicate with the back end applications 112 and 114 by message queuing, such that a dedicated synchronous link between the front end applications 108 and 110 and the back end applications 112 and 114 is not required. The secondary servers 252, 254, 256, 258, and 260 implement queue managers 262, 266, 270, 274, and 278 and queues 263, 264, 267, 268, 271, 272, 275, 276, 279, and 280 that enable the front end applications 108 and 110 to communicate with the back end applications 112 and 114 by message queuing, such that a dedicated synchronous link between the front end applications 108 and 110 and the back end applications 112 and 114 is not required. The queues 213, 214, 217, 218, 221, 222, 225, 226, 229, 230, 263, 264, 267, 268, 271, 272, 275, 276, 279, and 280 may be for example, International Business Machines (IBM) Message Queuing (MQ) Series message queues, Java® Message Service (JMS) queues, or other message services queues known to one of ordinary skill in the art that may be employed.

The primary servers 202, 204, 206, 208, and 210 and/or the secondary servers 252, 254, 256, 258, and 260 may be associated with a plurality of networks or data center components, such as network nodes, routers, or data center computer systems. The primary servers and/or secondary servers may comprise memory components that host the applications and associated objects or data structures, and processing components that process the applications and objects. Some primary servers and/or secondary servers may also be located on the same component, such as at least some of the primary servers 202, 204, 206, 208, and 210 and/or the secondary servers 252, 254, 256, 258, and 260. For example, the cluster of primary servers 202, 204, 206, 208, and 210 and/or the cluster of secondary servers 252, 254, 256, 258, and 260 may be a plurality of NICs in a server rack at a data center. Queue managers 212, 216, 220, 224, and 228 may be applications hosted in the primary servers that manage the corresponding queues. Queue managers 262, 266, 270, 274, and 278 may be applications hosted in the secondary servers that manage the corresponding queues. While the components are represented as communicating via arrows, it is understood that all the components may communicate via a communication network provided by one or more private networks, one or more public networks, or a combination thereof.

Each primary server 202, 204, 206, 208, and 210 may include one or more queue managers 212, 216, 220, 224, and 228 to determine whether messages received are intended for one of the primary server's queues or intended to be temporarily stored and subsequently forwarded to another server's queues. For example, a first primary server 202 may comprise a first queue manager 212, a second primary server 204 may comprise a second queue manager 216, a third primary server 206 may comprise a third queue manager 220, a fourth primary server 208 may comprise a fourth queue manager 224, and a fifth primary server 210 may comprise a fifth queue manager 228. Each of the queue managers 212, 216, 220, 224, and 228 may be configured to manage a transmission queue and a local queue, an inbound queue and an outbound queue, or any other types of queues. For example, the first queue manager 212 may manage a first queue 213 and a second queue 214, the second queue manager 216 may manage a third queue 217 and a fourth queue 218, the third queue manager 220 may manage a fifth queue 221 and a sixth queue 222, the fourth queue manager 224 may manage a seventh queue 225 and an eighth queue 226, and the fifth queue manager 228 may manage a ninth queue 229 and a tenth queue 230. The queue managers 212, 216, 220, 224, and 228 may be located separately on the servers 202, 204, 206, 208, and 210, or any combination of the queue managers 212, 216, 220, 226, and 228 may be located on any of the servers 202, 204, 206, 208, and 210. Furthermore, the queues 213, 214, 217, 218, 221, 222, 225, 226, 229, and 230 may be located in separate pairs on the servers 202, 204, 206, 208, and 210, in any combination on any of the servers 202, 204, 206, 208, and 210, or on other servers which are not pictured.

Each of the queue managers 212, 216, 220, 224, and 228 may be configured to detect and record the enqueue rate of messages moving into the queues as well as detect and record the weight of the queues (e.g. weight may be provided as a percentage of maximum weight, as percentage of the maximum enqueue rate that the primary queue is capable of handling, and/or the like). In an embodiment, a separate application server may comprise a one or more application which the enqueue rate of message moving into the queues and/or count the quantity of messages moving into the queues. The separate application server may transmit the enqueue rates and/or the quantity of message moving into the queues to the queue managers. The queue managers 212, 216, 220, 224, and 228 may be configured to send status messages comprising the enqueue rate and/or the weight of the queue(s) to, for example the cluster server repository component 116, and receive commands from, for example the cluster server repository component 116, directing the queue managers 212, 216, 220, 224, and 228 to increase the weight and/or decrease the weight of the queues 213, 214, 217, 218, 221, 222, 225, 226, 229, and 230, activate the queues 213, 214, 217, 218, 221, 222, 225, 226, 229, and 230, and/or deactivate the queues 213, 214, 217, 218, 221, 222, 225, 226, 229, and 230. The queues managers 212, 216, 220, 224, and 228 may also be configured to communicate with each other, the cluster server repository component 116, the queue managers 262, 266, 270, 274, and 278, and/or the one or more additional queue managers.

Similar to the primary cluster servers, each secondary server 252, 254, 256, 258, and 260 may include one or more queue managers 262, 266, 270, 274, and 278 to determine whether messages received are intended for one of the secondary server's queues or intended to be temporarily stored and subsequently forwarded to another server's queues. For example, a first secondary server 252 may comprise a sixth queue manager 262, a second secondary server 254 may comprise a seventh queue manager 266, a third secondary server 256 may comprise a eighth queue manager 270, a fourth secondary server 258 may comprise a ninth queue manager 274, and a fifth secondary server 260 may comprise a tenth queue manager 278. Each of the queue managers 262, 266, 270, 274, and 278 may manage a transmission queue and a local queue, an inbound queue and an outbound queue, or any other types of queues. For example, the sixth queue manager 262 may manage an eleventh queue 263 and a twelfth queue 264, the seventh queue manager 266 may manage a thirteenth queue 267 and a fourteenth queue 268, the eighth queue manager 270 may manage a fifteenth queue 271 and a sixteenth queue 272, the ninth queue manager 274 may manage a seventeenth queue 275 and an eighteenth queue 276, and the tenth queue manager 278 may manage a nineteenth queue 279 and a twentieth queue 280. The queue managers 262, 266, 270, 274, and 278 may be located separately on the servers 252, 254, 256, 258, and 260, or any combination of the queue managers 262, 266, 270, 274, and 278 may be located on any of the servers 252, 254, 256, 258, and 260. Furthermore, the queues 263, 264, 267, 268, 271, 272, 275, 276, 279, and 280 may be located in separate pairs on the secondary servers 252, 254, 256, 258, and 260, in any combination on any of the secondary servers 252, 254, 256, 258, and 260, or on other servers which are not pictured.

Each of the queue managers 262, 266, 270, 274, and 278 may be configured to detect and record the enqueue rate of messages moving into the queues as well as detect and record the weight of the queues. The queue managers 262, 266, 270, 274, and 278 may be configured to send status messages comprising the enqueue rate and/or the weight of the queue(s) to, for example, the cluster server repository component 116, and receive commands from, for example, the cluster server repository component 116, directing the queue managers 262, 266, 270, 274, and 278 to increase the weight and/or decrease the weight of the queues 263, 264, 267, 268, 271, 272, 275, 276, 279, and 280, activate the queues 263, 264, 267, 268, 271, 272, 275, 276, 279, and 280, and/or deactivate the queues 263, 264, 267, 268, 271, 272, 275, 276, 279, and 280. The queues managers 262, 266, 270, 274, and 278 may also be configured to communicate with each other, cluster server repository component 116, the queue managers 212, 216, 220, 224, and 228, and/or the one or more additional queue managers. Additionally, the secondary servers 252, 254, 256, 258, and 260 with queues 263, 264, 267, 268, 271, 272, 275, 276, 279, and 280 may be configured as back-up servers with back-up queues so that if one or more (primary) queue(s) 213, 214, 217, 218, 221, 222, 225, 226, 229, and 230 do not function as intended and/or fail, one or more (secondary) queue(s) 263, 264, 267, 268, 271, 272, 275, 276 279, and 280 may be activated to make up for the deficiencies and/or failures of the (primary) queue(s) 213, 214, 217, 218, 221, 222, 225, 226 229, and 230.

The front end server 104 may have a front end application queue manager 142 that manages a first front end application queue 144 and a second front end application queue 146 and determines where a message will be initially sent to communicate with the back end applications 112 and 114. For example, the front end application queue manager 142 may send a first message from the first front end application queue 144 for the first front end application 108 to the first queue 213, which may be referred to as the first transmission queue 213. The first queue manager 212 may evaluate messages received on the first transmission queue 213, and determine whether each message can be serviced locally by the second queue 214, which may be referred to as the first local queue 214, or needs to be forwarded to another queue. In this example, the first queue manager 212 may take the first message from the first transmission queue 213 and put the first message on the first local queue 214, which makes the message directly available to the first back end application 112. Subsequently, the first back end application 112 may check the first local queue 214 for messages that can be serviced locally, and provide the data requested by the message. After the first back end application 112 provides the data requested by the message, the first queue manager 212 may transfer the message from the first local queue 214 back to the first transmission queue 213. The first transmission queue 213 may return the message with the requested data back to the first front end application queue 144 for the first front end application 108.

In another example, the front end application queue manager 142 may send a second message from the front end application queue 144 for the second front end application 110 to the first transmission queue 213. If the first queue manager 212 determines that the message cannot be serviced locally by the first local queue 214, the first queue manager 212 may forward the message in the first transmission queue 213 to another queue. The first queue manager 212 may forward the message to a transmission queue associated with a local queue that directly services the message or to a transmission queue that forwards the message on to yet another transmission queue. The local queue that directly services the message may be referred to as the destination queue for the message. Continuing this example, the first queue manager 212 may forward the message to the third queue 217, which may be referred to as the second transmission queue 217.

The second queue manager 216 evaluates messages received on the second transmission queue 217, and determines whether each message can be serviced locally by the fourth queue 218, which may be referred to as the second local queue 218, or needs to be forwarded to another transmission queue. If the second queue manager 216 determines that the message can be serviced locally by the second local queue 218, the second queue manager 216 transfers the message from the second transmission queue 217 to the second local queue 218. If the second local queue 218 is a queue that is serviced by the second back end application 114, the second local queue 218 may be the destination queue for the message. Subsequently, the second back end application 114 may check the second local queue 218 for messages that can be serviced locally, and provides the data requested by the message. After the second back end application 114 provides the data requested by the message, the second queue manager 216 may transfer the message with the data from the second local queue 218 back to the second transmission queue 217. The second transmission queue 217 then returns the message with the requested data back to the first front end application queue 144 for the second front end application 110.

The front end application queue manager 142 may monitor the sequence in which the front end application queue manager 142 sends messages to the primary servers 202, 204, 206, 208, and 210, and use this sequence to load balance and distribute the messages appropriately between the servers 202, 204, 206, 208, and 210 over time. For example, load balancing may comprise distributing message to queues according to one or more algorithms. For example, if a first queue is receiving messages at a specified enqueue rate, a queue manager may look to see if there is one or more additional queues (e.g. by inquiring partial repositories) which are under the same identification (e.g. name) as the first queue and distribute messages to the additional queue(s).

Furthermore, queue managers may examine the weightings of queues and distribute messages to the one or more of the queues based on their weights. The front end application queue manager 142 may perform other functions known to one skilled in the art. The system 100 may also comprises a cluster server repository component 116, which may be an application that monitors message queue data in the system 100, e.g., to monitor the enqueue rate of messages moving into and/or out of a queue. Although depicted as separate from the servers 202, 204, 206, 208, 210, 252, 254, 256, 258, and 260, the cluster server repository component 116 can be executed anywhere in the system 100. The numbers of user interfaces, management components, front end servers, clustered servers, back end servers, queue managers, and queues in the system 100 are depicted in FIG. 1 for the purpose of an illustrative example, as the system 100 can include any number of user interfaces, management components, front end servers, clustered servers, back end servers, queue managers, and queues. In some embodiments, a front end server or a back end server may also comprise a queue manager and one or more corresponding queues.

The cluster server repository component 116 may be configured to transmit one or more command messages to primary queue managers, secondary queue managers, and/or front end application queue managers to adjust the enqueue rate(s) of messages moving into one or more particular queues. For example, the cluster server repository component 116 may transmit a command message to the front end application queue manager 142 and/or the first queue manager 212 directing that the enqueue rate of messages moving into the first queue 213 and/or the second queue 213 be decreased. The cluster server repository component 116 may transmit a command message to the front end application queue manager 142 and/or one or more other queue managers directing that the enqueue rate of messages moving into one or more other queues (e.g. queues on other primary servers and/or queues on secondary servers) be increased, for example, to offset the reduction in the enqueue rate of messages moving into the first queue 213 and/or the second queue 214.

The cluster server repository component 116 may be configured to transmit one or more command messages to primary queue managers, secondary queue managers, and/or front end application queue managers to adjust the weight of one or more particular queues. For example, the cluster server repository component 116 may transmit a command message to the first queue manager 212 directing that the weight of the first queue 213 and/or the second queue 213 be decreased. The cluster server repository component 116 may transmit a command message to one or more other queue managers directing that the weight of one or more other queues (e.g. queues on other primary servers and/or queues on secondary servers) be increased, for example, to offset the reduction in weight of the first queue 213 and/or the second queue 214.

The cluster server repository component 116 may be configured to activate and/or deactivate one or more queues on a primary server and/or a secondary server. For example, the cluster server repository component 116 may transmit a deactivation message to the first queue manager 212 of the first primary server 202 directing that the first queue 213 and/or the second queue 214 be deactivated. The cluster server repository component 116 may also transmit an activation message to the sixth queue manager 262 of the first secondary server 252 directing that the eleventh queue 263 and/or the twelfth queue 264 be activated to make up for the lost enqueue rate of message moving into the deactivated first queue 213 and/or the deactivated second queue 214.

The cluster server repository component 116 may receive and monitor the enqueue rate of messages moving into and/or out of queues and/or servers, such as any of the queues in the servers 202, 204, 206, 208, 210, 252, 254, 256, 258, and 260. For example, applications, such as the first front end application 108 and the second front end application 110, may transmit a plurality of messages to a server, such as the first primary server 202. The first queue manager 212 of the first primary server 202 may distribute the messages to first queue 213 and/or the second queue 214, to generate a response to the message by a processor, for example a processor of a backend server. While the messages move into the server 202, the first queue 213, and/or the second queue 214, the first queue manager 212 may detect and/or record the enqueue rate of messages moving into the first queue 213 and/or second queue 214. The first queue manager 212 may also detect and/or record the weight of the first queue 213 and/or the weight of the second queue 214 at the same and/or similar time when the enqueue rate of the first queue 213 and/or the second queue 214 was recorded.

The first queue manager 212 may detect and/or record the enqueue rates of messages moving into the first queue 213 and/or second queue 214 and/or the weights of the first queue 213 and/or the second queue 214 continuously and/or at time intervals, such as about once every 10 seconds, about once every 20 seconds, about once every 30 seconds, about once every 40 seconds, about once every 50 seconds, about once every minute, about once every two minutes, about once every three minutes, about once every four minutes, about once every five minutes, about once every six minutes, about once every seven minutes, about once every eight minutes, about once every nine minutes, about once every ten minutes, about once every 12 minutes, about once every 15 minutes, about once every 18 minutes, about once every 20 minutes, about once every 25 minutes, about once every 30 minutes, and/or the like.

After the first queue manage 212 detects and records the enqueue rates of messages moving into the first queue 213 and/or the second queue 214 and/or the weight of the first queue 213 and/or the second queue 214, the first queue manager 212 may transmit one or more status messages to the cluster server repository component 116 comprising the enqueue rate(s) of messages moving into the first queue 213 and/or the second queue 214 and/or the weight(s) of the first queue 213 and/or the second queue 214. Status messages may be transmitted from the first queue manager 212 and received by the cluster server repository component 116 continuously as the first queue manager detects and/or records the enqueue rates of messages moving into the first queue 213 and/or second queue 214 and/or the weight(s) of the first queue 213 and/or the second queue 214. In an embodiment, status messages may be transmitted from the first queue manager 212 and received by the cluster server repository component 116 at time intervals similar to the time intervals that the first queue manager 212 detects and/or records the enqueue rates of messages moving into the first queue 213 and/or second queue 214 and/or the weights of the first queue 213 and/or the second queue 214. In an embodiment, status messages may be transmitted and/or received by the cluster server repository component 116 at and/or near the same time the first queue manager 212 detects and/or records the enqueue rates of messages moving into the first queue 213 and/or second queue 214 and/or the weights of the first queue 213 and/or the second queue 214. Additionally, in an embodiment, first queue manager 212 may also transmit one or more messages, for example in the same message with enqueue rate(s) and/or the weight(s), comprising the maximum and/or minimum operating weights of the first queue 213 and/or the second queue 214, as well as, the maximum and/or minimum operating enqueue rates of messages moving into the first queue 213 and/or the second queue 214. Alternatively and/or additionally, the cluster server repository component 116 may have stored the maximum and/or minimum operating weights of the first queue 214 and/or the second queue 214, as well as, the maximum and/or minimum operating enqueue rates of messages moving into the first queue 213 and/or the second queue 214 so that the first queue manager 212 may not have to provide that information in a status message to cluster server repository component 116.

While the previous example discloses the first queue manager 212 detecting and/or recording the enqueue rate(s) of messages moving into the first queue 213 and/or the second queue 214 and/or the weight(s) of the first queue 213 and/or the second queue 214, it should be understood that messages may also be moving into the third queue 217 and/or the fourth queue 218 of the second primary server 204, the fifth queue 221 and/or the sixth queue 222 of the third primary server 206, the seventh queue 225 and/or the eighth queue 226 of the fourth primary server 208, and/or the ninth queue 229 and/or the tenth queue 230 of the fifth primary server 210 at the substantially the same time. Thus, each of the queue managers of the primary servers may be detecting and/or recording the enqueue rates of messages moving into the queues of the primary servers and/or the weights of the queues of the primary servers. Similarly, each of the queue managers of the primary servers may be transmitting one or more status messages to the cluster server repository component 116 comprising the enqueue rates of messages moving into the queues of the primary servers and/or the weight(s) of the queues of the primary servers. In an embodiment, the queue managers of the primary servers may also transmit one or more messages comprising the maximum and/or minimum operating weights of the queues of the primary servers, as well as, the maximum and/or minimum operating enqueue rates of messages moving into the queues of the primary servers. Alternatively and/or additionally, the cluster server repository component 116 may have stored the maximum and/or minimum operating weights of the queues of the primary servers, as well as, the maximum and/or minimum operating enqueue rates of messages moving into the queues of the primary servers so that the queue managers of the primary servers may not have to provide that information in a status message to cluster server repository component 116.

Furthermore, it should be understood that messages may move into the eleventh queue 263 and/or the twelfth queue 264 of the first secondary server 252, the thirteenth queue 267 and/or the fourteenth queue 268 of the second secondary server 254, the fifteenth queue 271 and/or the sixteenth queue 272 of the third secondary server 256, the seventeenth queue 275 and/or the eighteenth queue 276 of the fourth secondary server 258, and/or the nineteenth queue 279 and/or the twentieth queue 280 of the fifth secondary server 260. Thus, when messages are moving into the queues of the secondary servers, each of the queue managers of the secondary servers may be detecting and/or recording the enqueue rates of messages moving into the queues of the secondary servers and/or the weights of the queues of the secondary servers. The secondary queue managers may detect and/or record the enqueue rates of messages moving into the queues of the secondary servers and/or the weights of the queues of the secondary servers at similar frequencies to the primary queue managers.

During operation, all queues of the primary servers may be operating within a predetermined range of enqueue rates of messages moving into the queues. Furthermore, the queues of the primary servers may also be operating above a minimum weight and below a maximum weight while staying within the predetermined range of enqueue rates of messages moving into the queues. Thus, because the queues of the primary servers are within the predetermined range of enqueue rates of messages moving into the queues while operating above a minimum weight and below a maximum weight, the cluster server repository component 116 may detect these parameters, via the status message(s) received from the queue managers of the primary servers, and maintain the queues of the primary queues in an active state and maintain the queues of the secondary servers in an inactive state.

Figure 2:
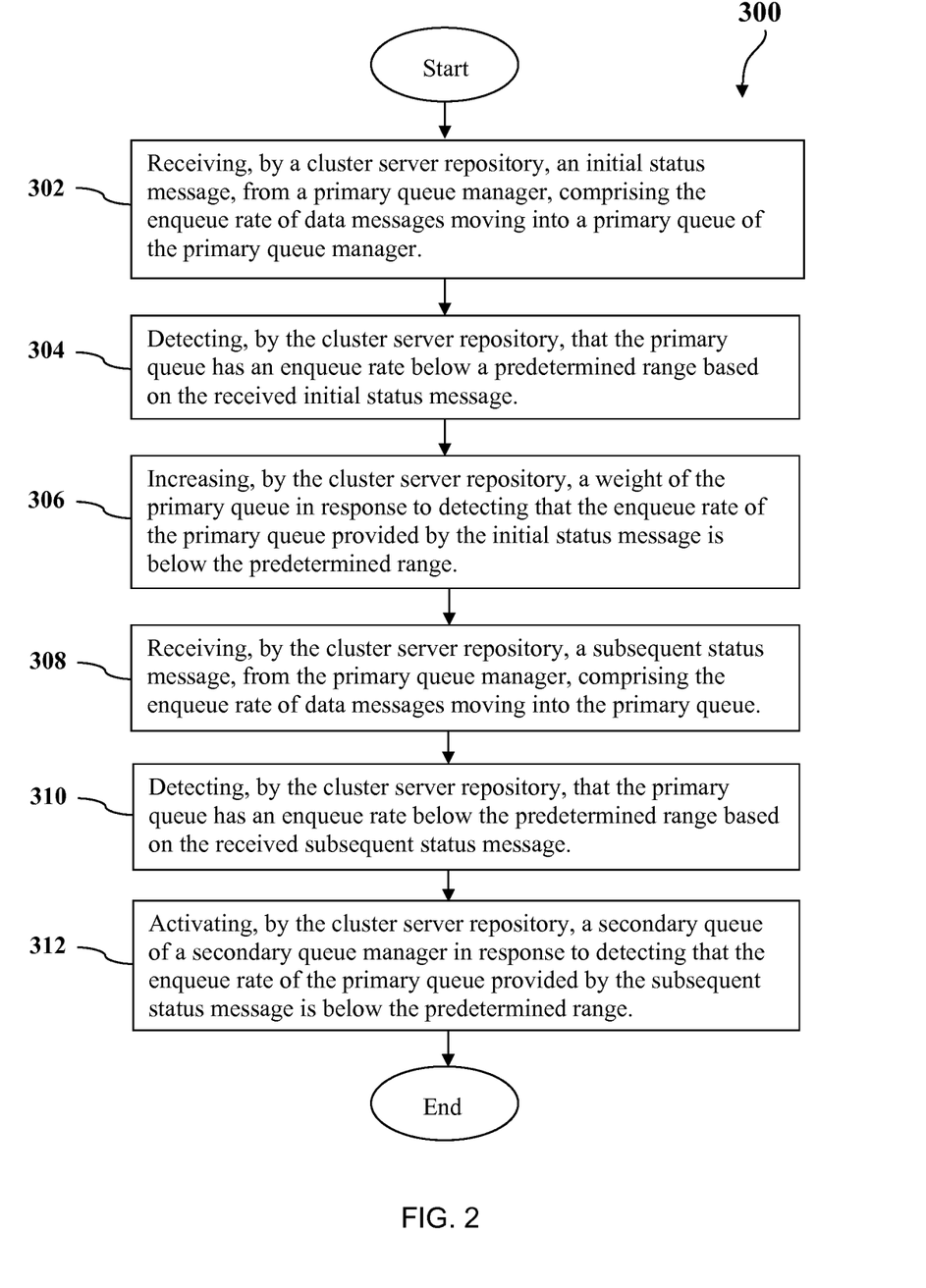
FIG. 2 is a flow chart of a method according to an embodiment of the disclosure.

However, a queue on the primary server (i.e. a primary queue) may have an enqueue rate of messages moving into the queue below the predetermined range of enqueue rate message moving into the queue of the primary server. FIG. 2 is a flowchart that illustrates a method 300 for maintaining an enqueue rate of data messages into a set of queues according to embodiments of the present disclosure. Executing the method 300 enables messages to be transmitted between front end servers and back end servers while maintaining an enqueue rate when one or more queues do not function as intended and/or fail. For example, the method 300 may be implemented by the cluster server repository 116 or any other software and/or hardware component in the system 100.

In box 302, the cluster server repository component 116 may receive an initial status message from a primary queue manager. The initial status message may comprise the enqueue rate of data messages moving into a primary queue of the primary queue manager. For example, the first queue manager 212 of the first primary server 202 may detect and/or record the enqueue rate of message moving into the first queue 213 and/or the second queue 214, as well as, the weight of the first queue 213 and/or the second queue 214. Upon detecting and/or recording, the first queue manager 212 may transmit one or more initial status messages comprising the enqueue rate of message moving into the first queue 213 and/or the second queue 214. In an embodiment, the one more initial status messages may also comprise the weight of the first queue 213 and/or the second queue 214. The cluster server repository component 116 may receive the initial status message sent from the first queue manager 212.

In box 304, the cluster server repository component 116 may detect that the enqueue rate of messages moving into the primary queue is below a predetermined range of enqueue rates of messages moving into the primary queue based on the received initial status message. For example, the cluster server repository component 116 may have stored the predetermined range of enqueue rates of messages moving into the first queue 213 and/or the second queue 214. The cluster server repository component 116 may have received the initial status message from the first queue manager 212 that the first queue 213 and/or the second queue 214 is operating with enqueue rates which are below the predetermined rates assigned to the first queue 213 and/or the second queue 214.

In an embodiment, each queue on the primary servers and/or the secondary servers may have different predetermined ranges of enqueue rates moving into the queues. For example, the predetermined range of enqueue rates moving into the first queue 213 and/or the second queue 214 may be different from the predetermined range of enqueue rates moving into the third queue 217 and/or the fourth queue 218. Additionally, the predetermined range of enqueue rates moving into the first queue 213 and/or the second queue 214 may be different from the predetermined range of enqueue rates moving into the eleventh queue 263 and/or the twelfth queue 264. Conversely, the predetermined range of enqueue rates moving into one or more of the queues on the primary servers and/or the secondary servers may be the same.

In an embodiment, the cluster server repository component 116 may detect that the enqueue rate of messages moving into the primary queue is below a predetermined range of enqueue rates of messages moving into the primary queue for a predetermined amount of time based on the received initial status message. For example, the first queue manager 212 may be continuously detecting and/or recording the enqueue rate(s) of messages moving into the first queue 213 and/or the second queue 214 and/or the weight(s) of the first queue 213 and/or the second queue 214. The first queue manager 212 may transmit one or more messages comprising the enqueue rate(s) of messages moving into the first queue 213 and/or the second queue 214 and/or the weight(s) of the first queue 213 and/or the second queue 214 every five minutes. The one or more messages may indicate that the enqueue rate of message moving into the first queue 213 and/or the second queue 214 was below the predetermined range of enqueue rates for an amount of time less than a predetermine amount of time. Thus, the cluster server repository component 116 may not adjust the queue rates of message moving into any of the queues, adjust the weight of one or more queues, deactivate one or more different queues, and/or activated one or more different queues. Conversely, the one or more messages may indicate that the enqueue rate of message moving into the first queue 213 and/or the second queue 214 was below the predetermined range of enqueue rates for an amount of time at least as long as the predetermine amount of time. Thus, the cluster server repository component 116 may adjust the queue rates of message moving into any of the queues, adjust the weight of one or more queues, deactivate one or more different queues, and/or activated one or more different queues.

In box 306, the cluster server repository component 116 may increase the weight of the primary queue in response to detecting that the enqueue rate of messages moving into the primary queue provided by the initial status message is below the predetermined range. For example, the cluster server repository component 116 may send a command message to the first queue manager 212 directing the first queue manager 212 to increase the weight of the first queue 213 and/or the second queue 214. By increasing the weight of the first queue 213 and/or the second queue 214, the first queue 213 and/or the second queue 214 may be capable of handling a higher enqueue rate of messages moving in the queue(s) 213 and/or 214, and thus attract more data messages to the first queue 213. In an embodiment, the front end application queue manager 142, the first queue manager 212, and/or one or more additional primary queue managers may receive a command message directing the increase of messages sent to the first queue 213 and/or the second queue 214. Thus, increasing the weight of the primary queue may comprise setting the enqueue rate of message moving into the first queue 213 and/or the second queue 214 above the predetermined range so that the actual enqueue rate of message moving into the first queue 213 and/or the second queue 214 reaches the predetermined range.

In box 308, the cluster server repository component 116 may receive a subsequent status message, from the primary queue manager. The subsequent status message may comprise the enqueue rate of data messages moving into the primary queue. For example, the first queue manager 212 of the first primary server 202 may again detect and/or record the enqueue rate of message moving into the first queue 213 and/or the second queue 214, as well as, the weight(s) of the first queue 213 and/or the second queue 214. Upon detecting and/or recording, the first queue manager 212 may transmit one or more subsequent status messages comprising the enqueue rate of message moving into the first queue 213 and/or the second queue 214. In an embodiment, the one more subsequent status messages may also comprise the weight(s) of the first queue 213 and/or the second queue 214. The cluster server repository component 116 may receive the subsequent status message sent from the first queue manager 212.

Furthermore, the subsequent status message may or may not be the status message received by the cluster server repository component 116 immediately following the initial status message received by the cluster server repository component 116. For example, the subsequent status message may be received by the cluster server repository component 116 after a predetermined period of time, such as ten minutes, beginning at the time the initial status message was received by the cluster server repository component 116. Thus, the cluster server repository component 116 may receive an intermediate status message seven minutes after the initial status message. The cluster server repository component 116 may detect from the intermediate status message that the primary queue remains below the predetermined range. The subsequent status message may be received by the cluster server repository component 116 twelve minutes after the initial status message. The subsequent status message may comprise an enqueue rate of message moving into the first queue 213 and/or the second queue 214 below a predetermined range. It should be understood that if the cluster server repository component 116 detects that the intermediate message comprises an enqueue rate of messages moving into the first queue 213 and/or the second queue 214 that is within the predetermined range, the next status message comprising an enqueue rate of message moving into the first queue 213 and/or the second queue 214 below the predetermined range may be another initial status message.

The subsequent status message may be received by the cluster server repository component 116 after receiving a predetermined number of status messages after the initial status message wherein all the status messages comprise an enqueue rate below the predetermined range. For example, the subsequent status message may be received by the cluster server repository component 116 after a receiving a predetermined number of status message, such as 3 status messages, with the first status message being the initial status message received by the cluster server repository component 116. The cluster server repository component 116 may receive a second status message providing an enqueue rate of the first queue 213 and/or the second queue 214 that is below the predetermined range. The cluster server repository component 116 may detect from the intermediate status message that the primary queue remains below the predetermined range. The third status message received by the cluster server repository component 116 may be the subsequent status message. The subsequent status message may comprise an enqueue rate of messages moving into the first queue 213 and/or the second queue 214 below a predetermined range. It should be understood that if the cluster server repository component 116 detects that the intermediate message comprises an enqueue rate of messages moving into the first queue 213 and/or the second queue 214 that is within the predetermined range, the next status message comprising an enqueue rate of message moving into the first queue 213 and/or the second queue 214 below the predetermined range may be another initial status message.

In block 310, the cluster server repository component 116 may detect that the enqueue rate of messages moving into the primary queue is below a predetermined range of enqueue rates of messages moving into the primary queue based on the received subsequent status message. For example, the cluster server repository component 116 may have stored the predetermined range of enqueue rates of messages moving into the first queue 213 and/or the second queue 214. The cluster server repository component 116 may have received the subsequent status message from the first queue manager 212 that the first queue 213 and/or the second queue 214 is operating with enqueue rates which are below the predetermined rates assigned to the first queue 213 and/or the second queue 214. Detecting that the enqueue rate of messages moving into the primary queue is below a predetermined range based on the received subsequent status message may indicate that the primary queue has failed and/or is no longer operable to receive data messages.

In block 312, the cluster server repository component 116 may activate a secondary queue of a secondary queue manager in response to detecting that the enqueue rate of the primary queue provided by the subsequent status message is below the predetermined range. For example, the cluster server repository component 116 may send a command message to the sixth queue manager 262 of the first secondary server 252 directing the sixth queue manager 262 to activate the eleventh queue 263 and/or the twelfth queue 264. The cluster server repository component 116 may also send a command message to the front end application queue manager 142 directing the front end application queue manager 142 to send messages to the eleventh queue 263 and/or the twelfth queue 264 instead of the first queue 213 and/or the second queue 214. In an embodiment, the cluster server repository component 116 may also send a command message to the first queue manager 212 directing the first queue manager 212 to deactivate the first queue 213 and/or the second queue 214. The activation of a secondary queue may allow the cluster server system 200 to maintain a sufficient transfer of data messages from a front end server to a back end server when a primary queue can no longer sustain an enqueue rate within a predetermined range. For example, the cluster server repository component 116 may assign an average weight of the primary queues to the eleventh queue 263 and/or the twelfth queue 264 so that the eleventh queue 263 and/or the twelfth queue 264 may adequately make up for the deficiencies of a failed primary queue.

Figure 3:
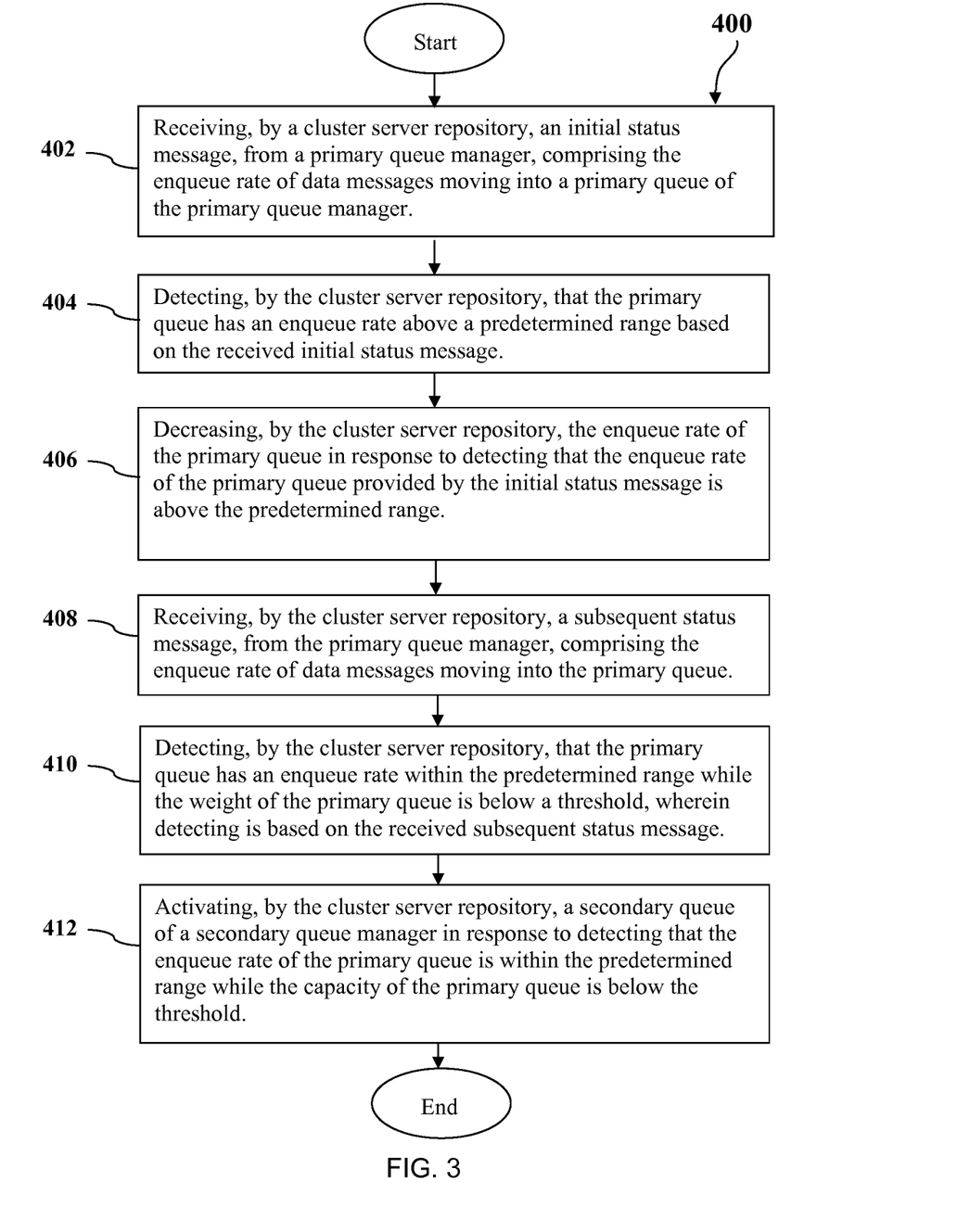
FIG. 3 is a flow chart of a method according to an embodiment of the disclosure.

A queue on the primary server may have an enqueue rate of messages moving into the queue above the predetermined range of enqueue rate message moving into the queue of the primary server. FIG. 3 is a flowchart that illustrates a method 400 for maintaining an enqueue rate of data messages into a set of queues according to embodiments of the present disclosure. Executing the method 400 enables messages to be transmitted between front end servers and back end servers while maintaining an enqueue rate when one or more queues do not function as intended and/or have failed. For example, the method 400 may be implemented by the cluster server repository component 116 or any other software and/or hardware component in the system 100.

In box 402, the cluster server repository component 116 may receive an initial status message from a primary queue manager. The initial status message may comprise the enqueue rate of data messages moving into a primary queue of the primary queue manager. The embodiments discussed with respect to box 302 in FIG. 2 may be similarly applied to box 402.

In box 404, the cluster server repository component 116 may detect that the enqueue rate of messages moving into the primary queue is above a predetermined range of enqueue rates of messages moving into the primary queue based on the received initial status message. For example, the cluster server repository component 116 may have stored the predetermined range of enqueue rates of messages moving into the first queue 213 and/or the second queue 214. The cluster server repository component 116 may have received the initial status message from the first queue manager 212 that the first queue 213 and/or the second queue 214 is operating with enqueue rates which are above the predetermined range assigned to the first queue 213 and/or the second queue 214.

In an embodiment, the cluster server repository component 116 may detect that the enqueue rate of messages moving into the primary queue is above a predetermined range of enqueue rates of messages moving into the primary queue for a predetermined amount of time based on the received initial status message. For example, the first queue manager 212 may be continuously detecting and/or recording the enqueue rate(s) of messages moving into the first queue 213 and/or the second queue 214 and/or the weight(s) of the first queue 213 and/or the second queue 214. The first queue manager 212 may transmit one or more messages comprising the enqueue rate(s) of messages moving into the first queue 213 and/or the second queue 214 and/or the weight(s) of the first queue 213 and/or the second queue 214 every five minutes. The one or more messages may indicate that the enqueue rate of messages moving into the first queue 213 and/or the second queue 214 was above the predetermined range of enqueue rates for an amount of time less than a predetermine amount of time. Thus, the cluster server repository component 116 may not adjust the queue rates of messages moving into any of the queues, adjust the weight of one or more queues, deactivate one or more different queues, and/or activated one or more different queues. Conversely, the one or more messages may indicate that the enqueue rate of messages moving into the first queue 213 and/or the second queue 214 was above the predetermined range of enqueue rates for an amount of time at least as long as the predetermine amount of time. Thus, the cluster server repository component 116 may adjust the enqueue rates of message moving into any of the queues, adjust the weight of one or more queues, deactivate one or more different queues, and/or activated one or more different queues.

In box 406, the cluster server repository component 116 may decrease the enqueue rate of messages moving into the primary queue in response to detecting that the enqueue rate of the primary queue provided by the initial status message is above the predetermined range. For example, the cluster server repository component 116 may send a command message to the first queue manager 212 directing the first queue manager 212 to decrease the weight of the first queue 213 and/or the second queue 214. By decreasing the weight of the first queue 213 and/or the second queue 214, the first queue 213 and/or the second queue 214 may handle less messages moving in the queue(s) 213 and/or 214 and thus attract less data messages to the first queue 213. In an embodiment, the front end application queue manager 142, the first queue manager 212, and/or one or more additional primary queue managers may receive a command message from the cluster server repository component 116 directing the decrease of messages sent to the first queue 213 and/or the second queue 214. In an embodiment, decreasing the weight of the primary queue balances the enqueue rates between the primary queue and/or one or more additional queues.

In box 408, the cluster server repository component 116 may receive a subsequent status message from the primary queue manager. The subsequent status message may comprise the enqueue rate of messages moving into the primary queue. For example, the first queue manager 212 of the first primary server 202 may again detect and/or record the enqueue rate of messages moving into the first queue 213 and/or the second queue 214, as well as, the weight of the first queue 213 and/or the second queue 214. Upon detecting and/or recording, the first queue manager 212 may transmit one or more subsequent status messages comprising the enqueue rate of messages moving into the first queue 213 and/or the second queue 214. In an embodiment, the one more subsequent status messages may also comprise the weight of the first queue 213 and/or the second queue 214. The cluster server repository component 116 may receive the subsequent status message sent from the first queue manager 212.

Furthermore, the subsequent status message may or may not be the status message received by the cluster server repository component 116 immediately following the initial status message received by the cluster server repository component 116. For example, the subsequent status message may be received by the cluster server repository component after a predetermined period of time, such as ten minutes, beginning at the time the initial status message was received by the cluster server repository component 116. Thus, the cluster server repository component 116 may receive an intermediate status message seven minutes after the initial status message. The cluster server repository component 116 may detect from the intermediate status message that the primary queue remains below the predetermined range. The subsequent status message may be received by the cluster server repository component 116 twelve minutes after the initial status message. The subsequent status message may comprise an enqueue rate of messages moving into the first queue 213 and/or the second queue 214 above a predetermined range. It should be understood that if the cluster server repository component 116 detects that the intermediate message comprises an enqueue rate of messages moving into the first queue 213 and/or the second queue 214 that is within the predetermined range, the next status message comprising an enqueue rate of messages moving into the first queue 213 and/or the second queue 214 above the predetermined range may be another initial status message.

The subsequent status message may be received by the cluster server repository component after receiving a predetermined number of status messages after the initial status message wherein all the status messages comprise an enqueue rate above the predetermined range. For example, the subsequent status message may be received by the cluster server repository component 116 after a receiving a predetermined number of status messages, such as 3 status messages, with the first status message being the initial status message received by the cluster server repository component 116. The cluster server repository component 116 may receive a second status message providing an enqueue rate of the first queue 213 and/or the second queue 214 that is above the predetermined range. The cluster server repository component 116 may detect from the intermediate status message that the primary queue remains above the predetermined range. The third status message received by the cluster server repository component 116 may be the subsequent status message. The subsequent status message may comprise an enqueue rate of messages moving into the first queue 213 and/or the second queue 214 above a predetermined range. It should be understood that if the cluster server repository component 116 detects that the intermediate message comprises an enqueue rate of messages moving into the first queue 213 and/or the second queue 214 that is within the predetermined range, the next status message comprising an enqueue rate of message moving into the first queue 213 and/or the second queue 214 above the predetermined range may be another initial status message.

In block 410, the cluster server repository component 116 may detect that the enqueue rate of messages moving into the primary queue is above and/or within the predetermined range of enqueue rates of messages moving into the primary queue while the weight of the primary queue is below a threshold, where the detecting is based on the received subsequent status message. For example, the cluster server repository component 116 may have stored the predetermined range of enqueue rates of messages moving into the first queue 213 and/or the second queue 214. The cluster server repository component 116 may have received the subsequent status message from the first queue manager 212 that the first queue 213 and/or the second queue 214 is operating with enqueue rates which are above and/or within the predetermined range assigned to the first queue 213 and/or the second queue 214. Additionally, because the enqueue rates of the primary queue may have decreased, the decreasing of the enqueue rates of the primary queue may correlate with decreasing the weight of the primary queue. Thus, while the enqueue rates of the primary queue may have been lowered to be within the predetermined range of enqueue rates, the weight of the primary queue may have been decreased below a minimum threshold weight. Detecting that the enqueue rate of messages moving into the primary queue is within a predetermined range while the weight of the primary queue is below a threshold may indicate that the primary queue has failed and/or is no longer operable to adequately receive data messages. Furthermore, detecting that the enqueue rate of messages moving into the primary queue is still above the predetermined range of enqueue rates of messages moving into the queue regardless of the weight of the primary queue may also indicate that the primary queue has failed and/or is no longer operable to adequately receive data messages. For example, after decreasing the enqueue rate of messages moving into the primary queue the cluster server repository component 116 may detect that the decrease of the enqueue rate did not decreased the enqueue rate at least as much as intended. Detecting that the enqueue rate of messages moving into the primary queue has not decrease as intended so that the enqueue rate of messages moving into the primary queue may not be within the predetermined range and thus may indicate that the primary queue has failed and/or is no longer operable to receive data messages.

In block 412, the cluster server repository component 116 may activate a secondary queue of a secondary queue manager in response to detecting that the enqueue rate of the primary queue is within the predetermined range while the weight of the primary queue is below the threshold. For example, the cluster server repository component 116 may send a command message the sixth queue manager 262 of the first secondary server 252 directing the sixth queue manager 262 to activate the eleventh queue 263 and/or the twelfth queue 264. The cluster server repository component 116 may also send a command message to the front end application queue manager 142 directing the front end application queue manager 142 send messages to the eleventh queue 263 and/or the twelfth queue 264 instead of the first queue 213 and/or the second queue 214. In an embodiment, the cluster server repository component 116 may also send a command message to the first queue manager 212 directing the first queue manager 212 to deactivate the first queue 213 and/or the second queue 214. The activation of a secondary queue may allow the cluster server system 200 to maintain a sufficient transfer of data messages from a front end server to a back end server when a primary queue can no longer sustain an enqueue rate within a predetermined range. For example, the cluster server repository component 116 may assign an average weight of the primary queues to the eleventh queue 263 and/or the twelfth queue 264 so that the eleventh queue 263 and/or the twelfth queue 264 may adequately make up for the deficiencies of a lost primary queue.

Figure 4:
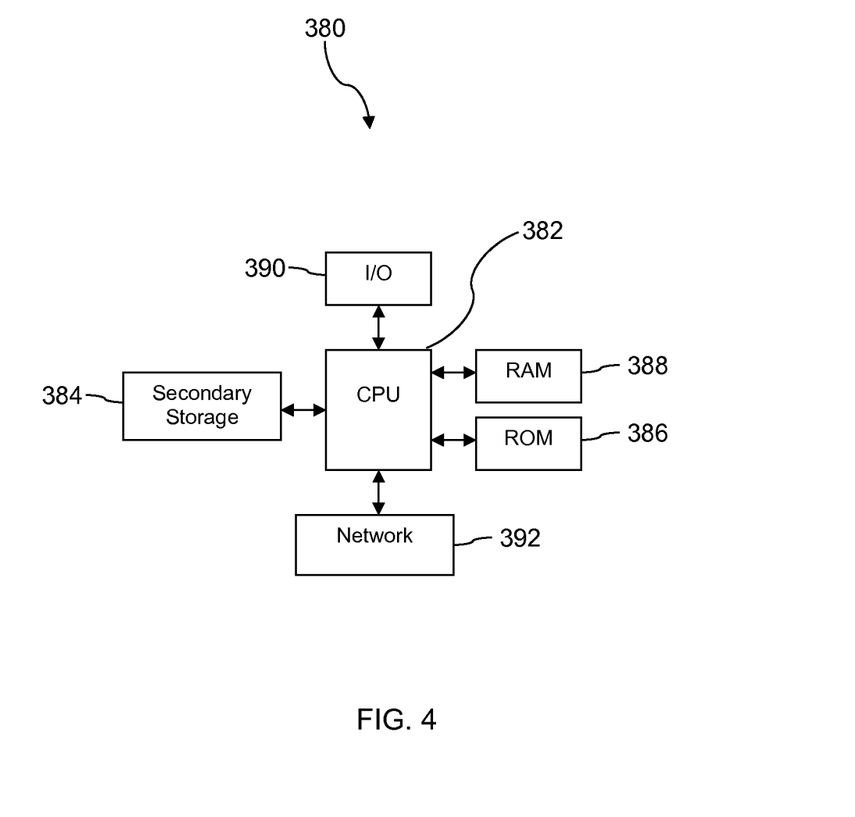
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory weight relative to the larger memory weight of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), 4th generation, 5th generation, and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for maintaining an enqueue rate of data messages into a set of queues, the system comprising:
    a server coupled to a cluster of primary servers and a cluster of secondary servers, the server comprising: a processor coupled to a non-transitory memory storing a cluster server repository component stored as a set of computer instructions that upon execution by the processor configures the server to:
    receive an initial status message, from a primary queue manager executing from non-transitory memory in the cluster of primary servers, comprising the enqueue rate of data messages moving into a primary queue of the primary queue manager,
    detect that the primary queue has an enqueue rate below a predetermined range based on the received initial status message,
    increase a weight of the primary queue in response to detecting that the enqueue rate of the primary queue provided by the initial status message is below the predetermined range,
    receive a subsequent status message, from the primary queue manager, comprising the enqueue rate of data messages moving into the primary queue after the weight of the primary queue is increased,
    detect that the primary queue has an enqueue rate below the predetermined range based on the received subsequent status message, and
    activate, in the cluster of secondary servers, a secondary queue of a secondary queue manager in response to detecting that the enqueue rate of the primary queue provided by the subsequent status message is below the predetermined range, wherein the secondary queue manager executes from non-transitory memory in the cluster of secondary servers.

2. The system of claim 1, wherein activating the secondary queue comprises directing data messages to the second queue at an enqueue rate within the predetermined range.

3. The system of claim 2, wherein directing data messages comprises sending a directing message to a front end queue manager directing the front end queue manager to send at least some data messages from a front end queue of the front end queue manager to the secondary queue.

4. The system of claim 1, wherein increasing the weight of the primary queue comprises setting the enqueue rate above the predetermined range so that the actual enqueue rate reaches the predetermined range.

5. The system of claim 1, wherein activating the secondary queue comprises sending a weight message to the secondary queue manager of the secondary queue assigning an average weight of the primary queues to the secondary queue.

6. The system of claim 1, wherein a remote application server monitors the enqueue rate of data messages into each primary queue of a plurality of primary queues and sends an enqueue rate message to each primary queue manager of each primary queue.

7. The system of claim 1, wherein the enqueue rate comprises the number of messages moving into a queue per minute.

8. The system of claim 1, wherein the server is further configured by the cluster server repository component to:
    detect that the primary queue has an enqueue rate above a predetermined range based on the received initial status message,
    decrease the enqueue rate of the primary queue in response to detecting that the enqueue rate of the primary queue provided by the initial status message is above the predetermined range, wherein the enqueue rate is decreased by decreasing the weight of the primary queue,
    receive a different status message, from the primary queue manager, comprising the enqueue rate of data messages moving into the primary queue,
    detect that the primary queue has an enqueue rate within the predetermined range while the weight of the primary queue is below a threshold, wherein detecting is based on the received different status message, and
    activate the secondary queue of the secondary queue manager in response to detecting that the enqueue rate of the primary queue is within the predetermined range while the weight of the primary queue is below the threshold.

9. The system of claim 8, wherein decreasing the weight of the primary queue balances the enqueue rate between the primary queue and one or more additional primary queues.

10. The system of claim 1, wherein the cluster server repository configures the server to activate the secondary queue of the secondary queue manager in response to detecting that the enqueue rate of the primary queue provided by the subsequent status message is below the predetermined range for a period of time.

11. A method of maintaining an enqueue rate of data messages into a set of queues, the method comprising:
    receiving, by a server executing a cluster server repository component from non-transitory memory, an initial status message from a primary queue manager executing from non-transitory memory in a cluster of primary servers, the initial status message comprising the enqueue rate of data messages moving into a primary queue of the primary queue manager;
    detecting, by the server executing the cluster server repository component, that the primary queue has an enqueue rate below a predetermined range based on the received initial status message;
    increasing, by the server executing the cluster server repository component, a weight of the primary queue in response to detecting that the enqueue rate of the primary queue provided by the initial status message is below the predetermined range;
    receiving, by the server executing the cluster server repository component, a subsequent status message, from the primary queue manager, comprising the enqueue rate of data messages moving into the primary queue after the weight of the primary queue is increased;

detecting, by the server executing the cluster server repository component, that the primary queue has an enqueue rate below the predetermined range based on the received subsequent status message; and activating, in a cluster of secondary servers by the server executing the cluster server repository component, a secondary queue of a secondary queue manager in response to detecting that the enqueue rate of the primary queue provided by the subsequent status message is below the predetermined range, wherein the secondary queue manager executes from non-transitory memory in the cluster of secondary servers.

12. The method of claim 11, further comprising directing, by the cluster server repository, data messages to the second queue at an enqueue rate within the predetermined range, wherein directing data messages comprises sending a directing message to a front end queue manager directing the front end queue manager to send at least some data messages from a front end queue of the front end queue manager to the secondary queue.

13. The method of claim 11, wherein increasing the weight of the primary queue comprises setting the enqueue rate above the predetermine range so that the actual enqueue rate reaches the predetermined range.

14. The method of claim 11, wherein detecting based on the received initial status message comprises detecting, by the cluster server repository, that the enqueue rate of the primary queue is below a predetermined range for a predetermined amount of time.

15. The method of claim 11, wherein the subsequent status message is received by the cluster server repository after a predetermine period of time beginning at the time the initial status message was received by the cluster server repository.

16. A method of maintaining an enqueue rate of data messages into a set of queues, the method comprising:

receiving, by a server executing a cluster server repository component from non-transitory memory, an initial status message from a primary queue manager executing from non-transitory memory in a cluster of primary servers, the initial status message comprising the enqueue rate of data messages moving into a primary queue of the primary queue manager;

detecting, by the server executing the cluster server repository component, that the primary queue has an enqueue rate above a predetermined range based on the received initial status message;

decreasing, by the server executing the cluster server repository component, the enqueue rate of the primary queue in response to detecting that the enqueue rate of the primary queue provided by the initial status message is above the predetermined range;

receiving, by the server executing the cluster server repository component, a subsequent status message, from the primary queue manager, comprising the enqueue rate of data messages moving into the primary queue;

detecting, by the server executing the cluster server repository component based on the received subsequent status message, that the primary queue has an enqueue rate within the predetermined range while a weight of the primary queue is below a threshold; and activating, in a cluster of secondary servers by the server executing the cluster server repository component, a secondary queue of a secondary queue manager in response to detecting that the enqueue rate of the primary queue is within the predetermined range while the weight of the primary queue is below the threshold, wherein the secondary queue manager executes from non-transitory memory in the cluster of secondary servers.

17. The method of claim 16, wherein decreasing the enqueue rate of the primary queue balances the enqueue rate between the primary queue and one or more additional primary queues.

18. The method of claim 16, wherein detecting based on the received initial status message comprises detecting, by the cluster server repository, that the enqueue rate of the primary queue is above a predetermined range for a predetermined amount of time.

19. The method of claim 16, wherein the subsequent status message is received by the cluster server repository after a predetermine period of time beginning at the time the initial status message was received by the cluster server repository.

20. The method of claim 16, wherein the subsequent status message comprises the weight of the primary queue.

* * * * *